United States Patent
Yamamoto et al.

(10) Patent No.: US 8,485,303 B2
(45) Date of Patent: Jul. 16, 2013

(54) UTILITY VEHICLE

(75) Inventors: Teruaki Yamamoto, Kakogawa (JP);
Kazuhiro Maeda, Akashi (JP);
Yoshinori Tsumiyama, Miki (JP);
Hidetoshi Kaku, Lincoln, NE (US)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 41 days.

(21) Appl. No.: 13/269,306

(22) Filed: Oct. 7, 2011

(65) Prior Publication Data

US 2013/0087397 A1   Apr. 11, 2013

(51) Int. Cl.
*B60G 21/055* (2006.01)
*B60K 11/04* (2006.01)

(52) U.S. Cl.
USPC ............ 180/311; 180/68.4; 280/124.166; 280/788

(58) Field of Classification Search
CPC .................................................. B60G 21/0551
USPC ............ 180/68.4, 311, 312; 280/124.106, 280/124.107, 124.134, 124.135, 124.152, 280/124.166, 781, 785, 788; 165/41
IPC ....................................................... B60G 21/055
See application file for complete search history.

(56) References Cited

U.S. PATENT DOCUMENTS

| | | | | |
|---|---|---|---|---|
| 4,842,298 A | * | 6/1989 | Jarvis | 280/124.154 |
| 6,250,660 B1 | * | 6/2001 | Woo | 280/124.149 |
| 7,216,733 B2 | * | 5/2007 | Iwami et al. | 180/68.1 |
| 7,258,192 B2 | * | 8/2007 | Davis et al. | 180/312 |
| 7,802,816 B2 | * | 9/2010 | McGuire | 280/788 |
| 7,992,280 B2 | * | 8/2011 | Fader et al. | 29/527.1 |
| 8,037,959 B2 | * | 10/2011 | Yamamura et al. | 180/68.4 |
| 8,079,602 B2 | * | 12/2011 | Kinsman et al. | 280/5.512 |
| 8,100,434 B2 | * | 1/2012 | Miura | 280/781 |

(Continued)

FOREIGN PATENT DOCUMENTS

KR  1020090124403 A  *  3/2009

OTHER PUBLICATIONS

Utility Vehicle Definition, Reverso Collins, English Dictionary for Learners, available at (last visited Jan. 11, 2013).*

(Continued)

*Primary Examiner* — Joseph Rocca
(74) *Attorney, Agent, or Firm* — Alleman Hall McCoy Russell & Tuttle LLP

(57) ABSTRACT

A utility vehicle comprises a vehicle body frame, a first pair of pivot arms provided at right and left sides, respectively, at a front end portion of the vehicle body frame such that the pivot arms extend in a rightward and leftward direction from the front end portion and are vertically pivotable, the first pair of pivot arms being attached to front wheels at tip ends thereof, respectively, and a stabilizer having one end mounted to one of the first pair of pivot arms and an opposite end mounted to the other of the first pair of pivot arms. The stabilizer extends through a front side of the vehicle body frame, outside the vehicle body frame, from the one end thereof to the opposite end thereof, and has an intermediate portion located in front of the vehicle body frame and mounted to the front end portion of the vehicle body.

7 Claims, 8 Drawing Sheets

U.S. PATENT DOCUMENTS

2005/0073126 A1* 4/2005 Seki .................... 280/124.152
2007/0176387 A1* 8/2007 Tsuruta et al. ......... 280/124.135
2008/0023249 A1* 1/2008 Sunsdahl et al. .............. 180/312
2009/0078491 A1* 3/2009 Tsutsumikoshi et al. ..... 180/443
2009/0121518 A1* 5/2009 Leonard et al. ............ 296/183.1

OTHER PUBLICATIONS

Plate—definition of plate, available at http://www.freedictionary.org/?Query=plate (last visited on Jan. 11, 2013).*

* cited by examiner

UTILITY VEHICLE

BACKGROUND OF THE INVENTION

1. Field of the Invention

The present invention relates to a utility vehicle including a stabilizer.

2. Description of the Related Art

In a utility vehicle, a stabilizer is mounted to right and left rear arms attached with rear wheels, respectively, to suppress a vehicle body from rolling during driving. It is difficult to suppress a front portion of the vehicle body from rolling, using the stabilizer mounted to the right and left rear arms. To solve this, another stabilizer may possibly be provided at the front portion of the vehicle body. However, since various devices such as a driving power transmission mechanism and a steering mechanism are arranged at the front portion of the vehicle body, it is necessary to position the stabilizer in a space between these devices in the front portion. This make the stabilizer complex in shape, making it difficult to position and manufacture the stabilizer.

SUMMARY OF THE INVENTION

The present invention addresses the above described problem, and an object of the present invention is to provide a utility vehicle which can simplify a stabilizer in shape and can be easily assembled into the utility vehicle.

A utility vehicle of the present invention comprises a vehicle body frame; a first pair of pivot arms provided at right and left sides, respectively, at a front end portion of the vehicle body frame such that the first pair of pivot arms extend in a rightward and leftward direction from the front end portion of the vehicle body frame and are vertically pivotable, the first pair of pivot arms being attached with front wheels at tip ends thereof, respectively; and a stabilizer having one end mounted to one of the first pair of pivot arms and an opposite end mounted to the other of the first pair of pivot arms, the stabilizer extending through a front side of the vehicle body frame, outside the vehicle body frame, from the one end thereof to the opposite end thereof, the stabilizer having an intermediate portion located in front of the vehicle body frame and mounted to the front end portion of the vehicle body.

In accordance with this configuration, the stabilizer is mounted to the pair of pivot arms through the front side of the vehicle body frame, where a space can be ensured, such that the stabilizer extends through the outside of the vehicle body frame, rather than the inside of the vehicle body frame. Because of this layout, the stabilizer can be mounted to the vehicle body frame in a forward direction without causing the stabilizer to pass through the inside of the vehicle body frame. This allows the stabilizer to have a simple shape and to be mounted easily to the vehicle body frame.

The above and further objects, features and advantages of the invention will more fully be apparent from the following detailed description with reference to the accompanying drawings.

DETAILED DESCRIPTION OF THE PREFERRED EMBODIMENTS

Figure 1:
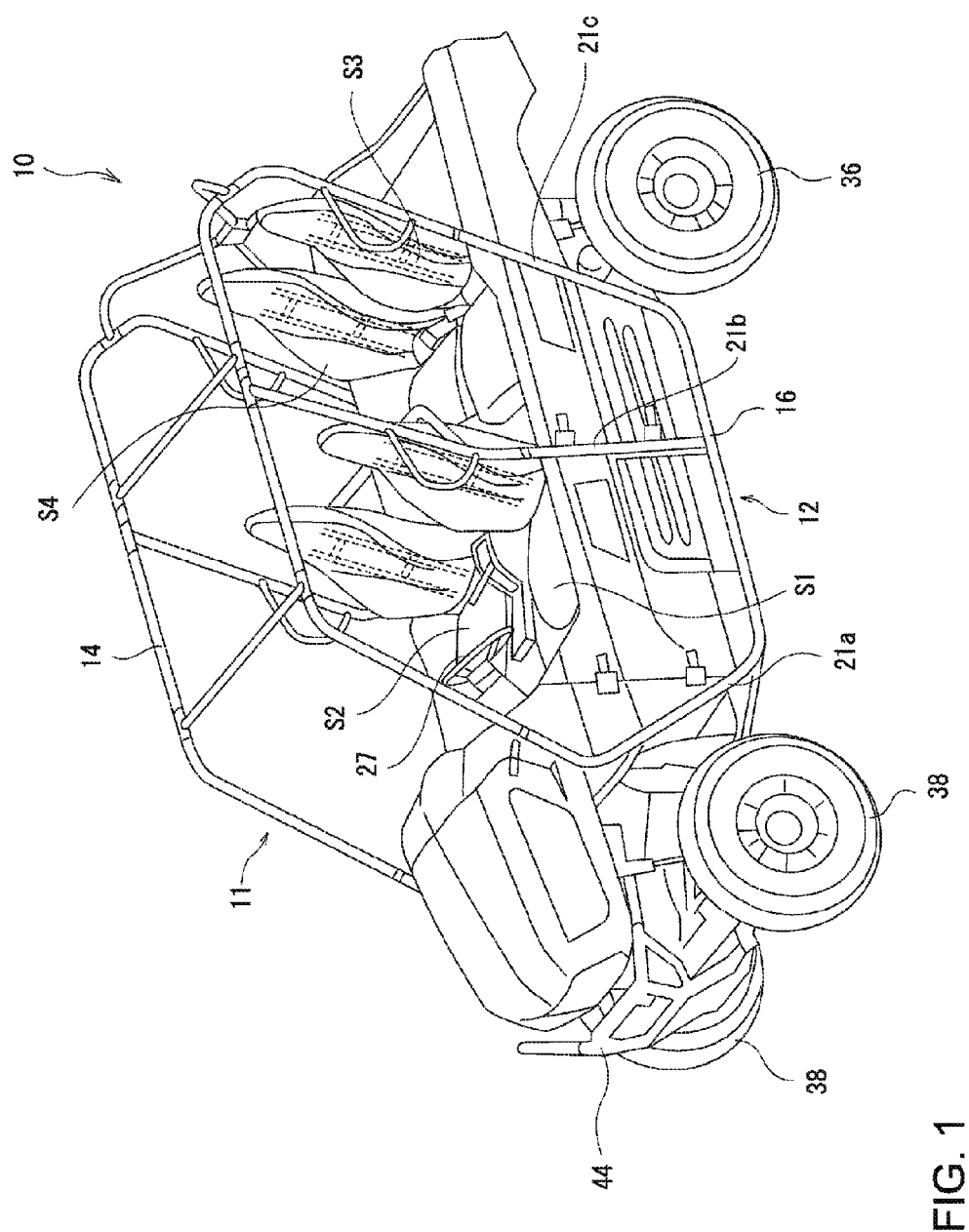
FIG. 1 is a perspective view showing an overall external appearance of a utility vehicle according to Embodiment 1.

Hereinafter, a utility vehicle 10 according to an embodiment of the present invention will be described with reference to FIGS. 1 through 8. Throughout the drawings, the same or corresponding components are identified by the same reference numerals and will not be described in repetition. The stated directions are referenced from the perspective of a driver riding in the utility vehicle 10 unless otherwise explicitly noted. The utility vehicle 10 described below is merely an embodiment of the present invention. The present invention is in no way limited to the embodiment, and addition, deletion, and alternation can be made within the scope of the invention.

[Utility Vehicle]

The utility vehicle 10 is a MUV (multiple utility vehicle) intended to drive on unpaved roads. Referring to FIG. 1, the utility vehicle 10 has a vehicle body frame 11.

[Vehicle Body Frame]

Figure 2:
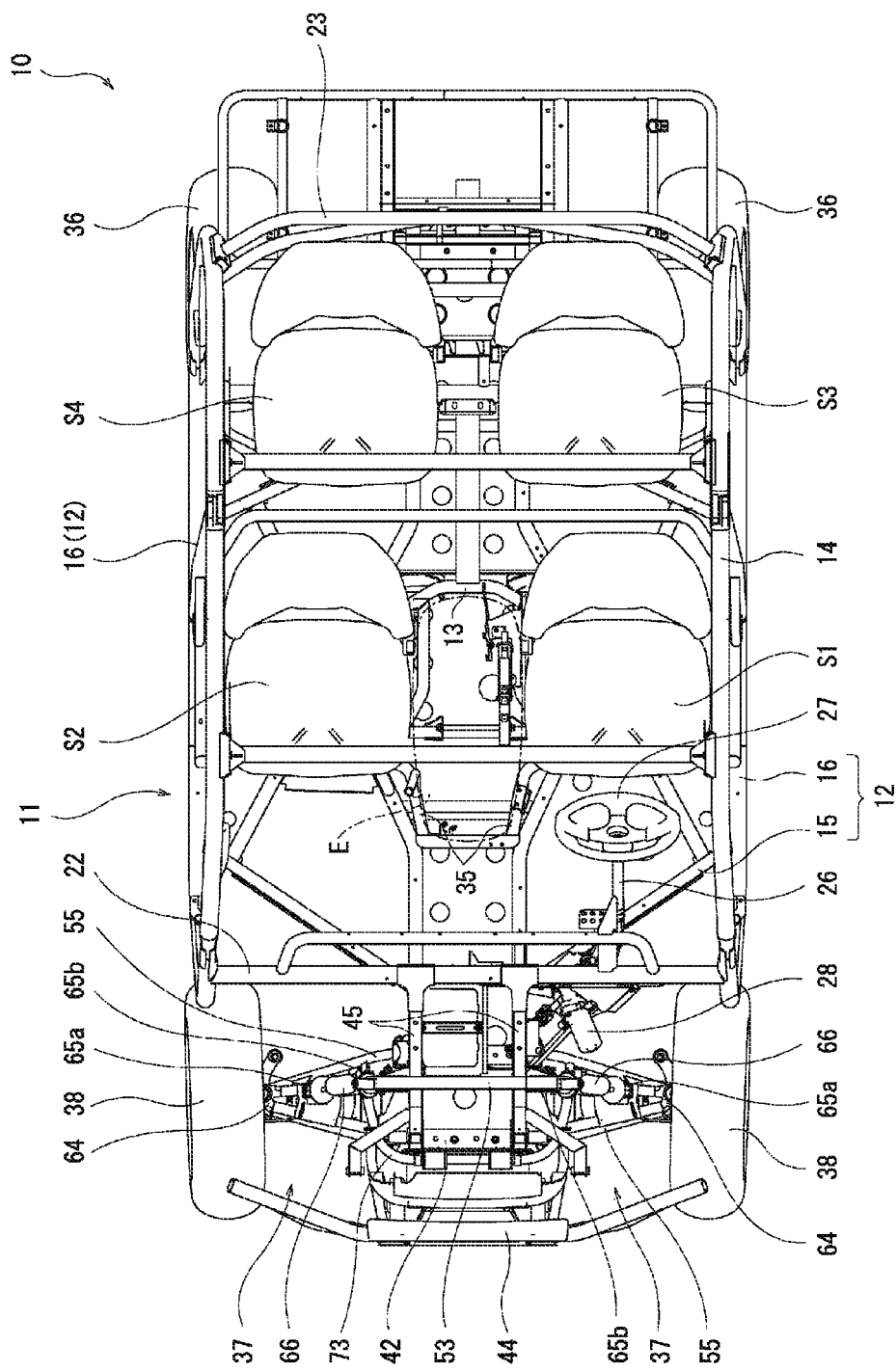
FIG. 2 is a plan view showing a construction of the utility vehicle of FIG. 1.

Referring to FIG. 2, the vehicle body frame 11 includes a main frame 12 and a cabin frame (ROPS) 14. The main frame 12 includes a floor member 15 and a side member 16.

Figure 3:
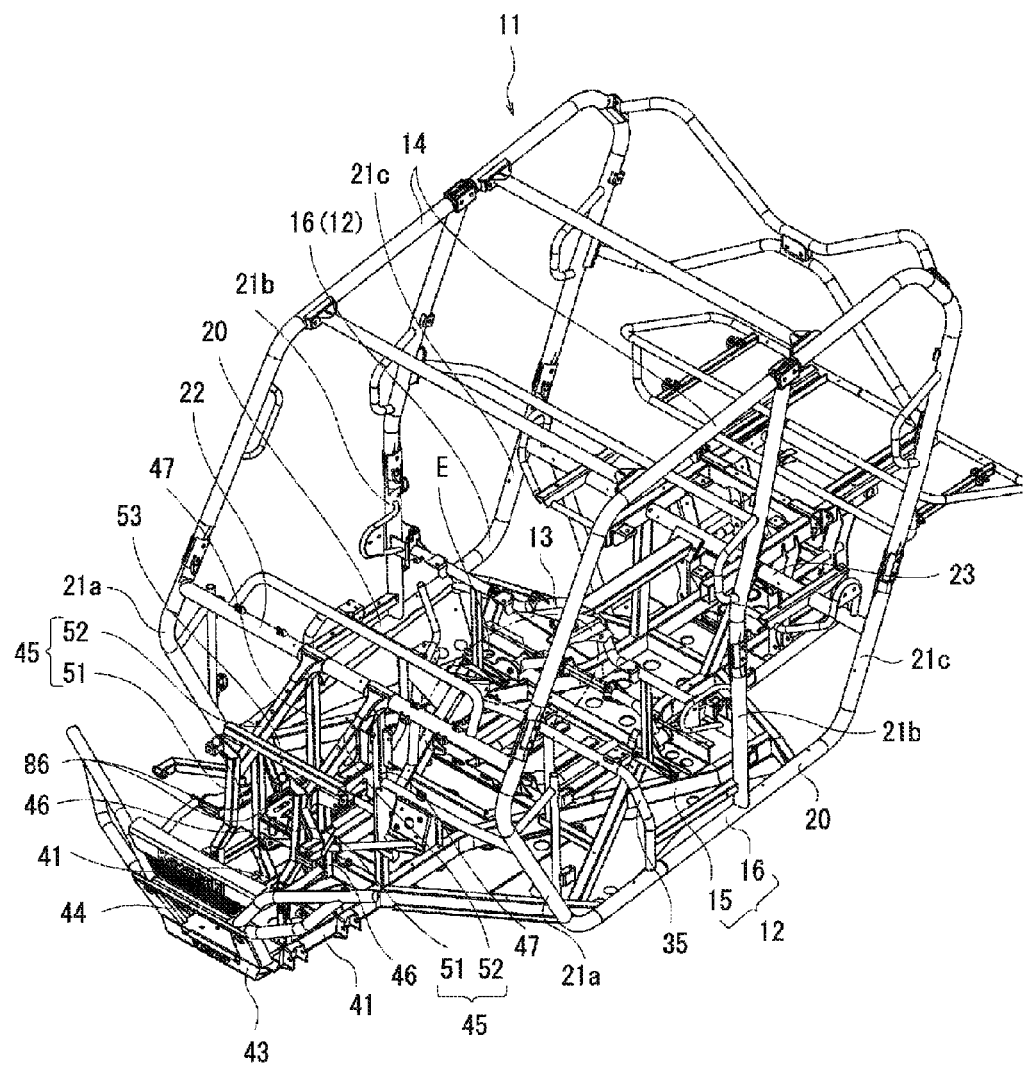
FIG. 3 is a perspective view showing a vehicle body frame of the utility vehicle of FIG. 1, as viewed from obliquely below.

Referring to FIG. 3, the floor member 15 includes a plurality of square pipes extending in a horizontal direction and being welded to each other to form a unitary construction. Side pipe elements 20 of side members 16 are mounted to right and left side portions of the floor member 15, respectively. A pair of first lower pillar pipe elements 21a are mounted to the front end portions of the side pipe elements 20, respectively, to extend upward. A pair of second lower pillar pipe elements 21b are mounted to the intermediate portions of the side pipe elements 20, respectively, to extend upward. A pair of third lower pillar pipe elements 21c are mounted to the rear end portions of the side pipe elements 20, respectively, to extend upward. A cabin frame (ROPS) 14 for supporting a roof and a hood are mounted over the upper end portions of the first to third lower pillar pipe elements 21a to 21c.

The pair of right and left first lower pillar pipe elements 21a are coupled to each other by means of a front cross member 22. The pair of right and left third lower pillar pipe elements 21c are coupled to each other by means of a rear cross member 23. The pair of right and left second lower pillar pipe elements 21b are coupled to each other by means of a subframe 13.

A support pipe 35 is mounted to the upper surface of the floor member 15. The support pipe 35 has an arc-shape extending upward, and extends in a rightward and leftward direction. The support pipe 35 is located in front of the subframe 13. An engine E is positioned between the support pipe 35 and the sub-frame 13. The engine E is located in a substantially center portion of the floor member 15 in a rightward and leftward direction and in a forward and rearward direction. Referring to FIG. 2, two seats S1 and S2 on which passengers may be seated are mounted to the upper surface of the support pipe 35 and the sub-frame 13 such that they are arranged side by side in the rightward and leftward direction. The engine E is positioned below a space between the two seats S1 and S2.

The two seats S1 and S2 are arranged at right and left sides of the engine E as viewed from above. Behind the two seats S1 and S2, the two seats S3 and S4 on which passengers are seated are arranged side by side in the rightward and leftward direction. The four seats S1 to S4 are arranged in a center region of the floor member 15. Among the four seats S1 to S4, the seat S1 at the front side and at the left side is a driver seat. In front of the seat S1, a steering shaft 26 is attached to the vehicle body frame 11 to extend forward and downward. A steering handle 27 is secured to the upper end portion of the steering shaft 26, while an electric power steering device 28 is mounted to the lower end portion of the steering shaft 26.

Rear suspension devices (not shown) are mounted to the rear portion of the vehicle body frame 11 constructed above, to be specific, the rear portion of the floor member 15. Two rear wheels 36 are mounted to the rear portion of the floor member 15 via the rear suspension devices, respectively. Front suspension devices 37 are mounted to the front portion of the vehicle body frame 11, to be specific, the front portion of the floor member 15. Two front wheels 38 are mounted to the front portion of the floor member 15 via the front suspension devices, 37 respectively. Hereinafter, components in the vicinity of the front portion of the vehicle body frame 1 will be described in more detail.

[Components in the Vicinity of Front Portion of Vehicle Body Frame]

Figure 4:
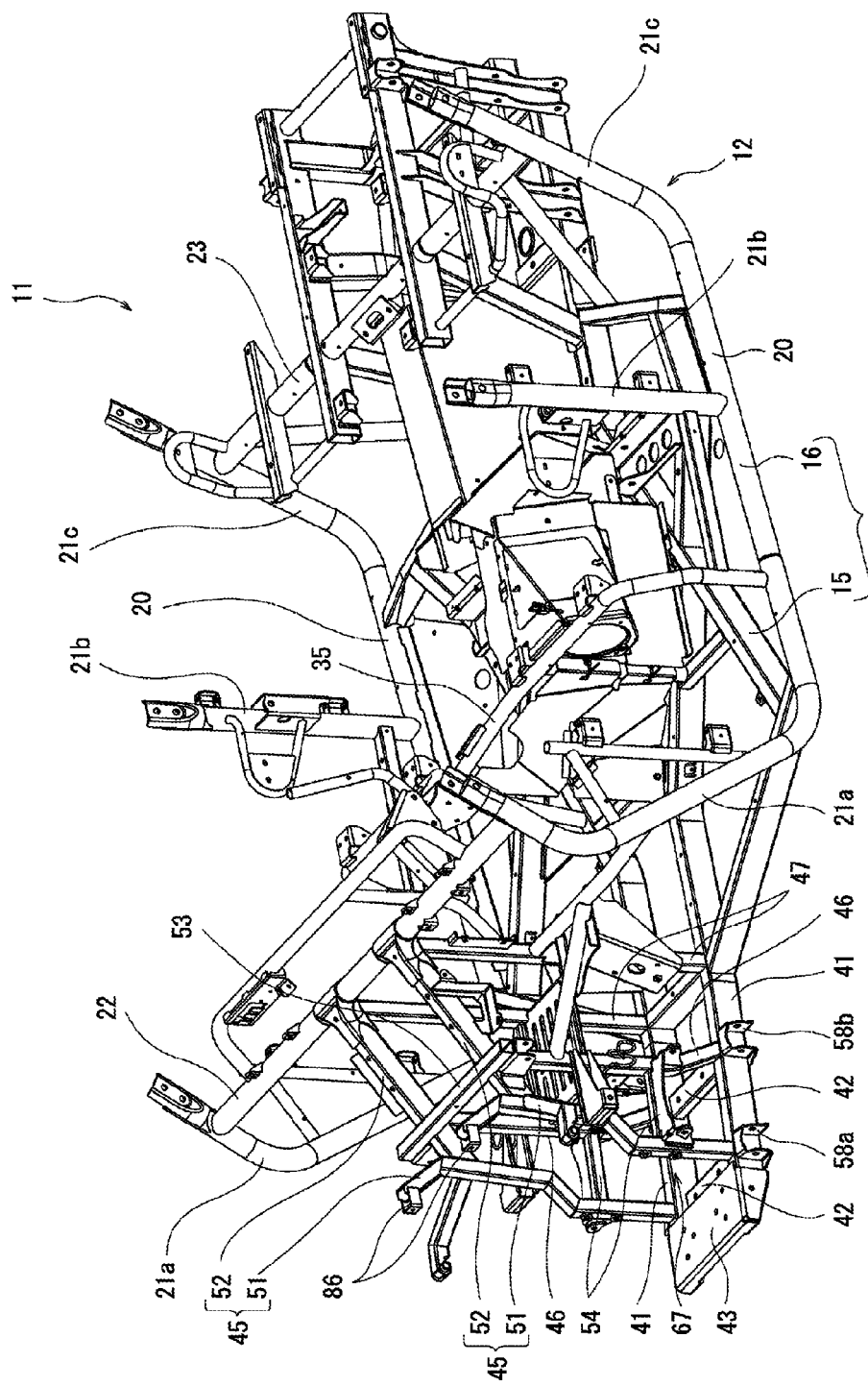
FIG. 4 is a perspective view showing a main frame of the vehicle body frame of FIG. 3, as viewed from obliquely above.

Referring to FIGS. 3 and 4, the vehicle body frame 11 includes a pair of front lower frames 41 at the front portion of the floor member 15. The pair of front lower frames 41 extend in the forward and rearward direction such that they are arranged side by side and apart from each other in the rightward and leftward direction. The pair of front lower frames 41 are located in front of the side members 16, respectively, when viewed from the side. The pair of front lower frames 41 are coupled to each other by means of a plurality of front lower cross members 42 extending in the rightward and leftward direction. A bumper mounting bracket 43 extending in the rightward and leftward direction is mounted to the front end portions of the pair of front lower frames 41. A front bumper 44 is mounted onto the bumper mounting bracket 43 to protrude forward and upward.

Each of the pair of front lower frames 41 is coupled to a front upper frame 45, a front upper sub-frame 46, and a center pipe 47. The front upper frame 45 is positioned at the front end portion of the vehicle body frame 11 and includes a vertically extending pipe element 51 and a tilted pipe element 52. The vertically extending pipe element 51 extends vertically upward from the upper surface of the front lower frame 41. The tilted pipe element 52 is mounted to the intermediate portion of the vertically extending pipe element 51. The tilted pipe element 52 extends rearward and upward from the vertically extending pipe element 51 and is coupled to the intermediate portion of the front cross member 22. A front upper cross member 53 is mounted to the upper surfaces of the intermediate portions of the pair of tilted pipe elements 52. The pair of tilted pipe elements 52 are coupled to each other by means of the front upper cross member 53. Each of the front upper frames 45 having such a structure is mounted to the upper surface of the front end portion of the front lower frame 41 and the intermediate portion of the front cross member 22. The front upper frames 45 substantially overlap with the front lower frames 41, respectively, as viewed from above. Front upper sub-frames 46 are mounted to the lower surfaces of the intermediate portions of the tilted pipe elements 52, respectively.

Figure 5:
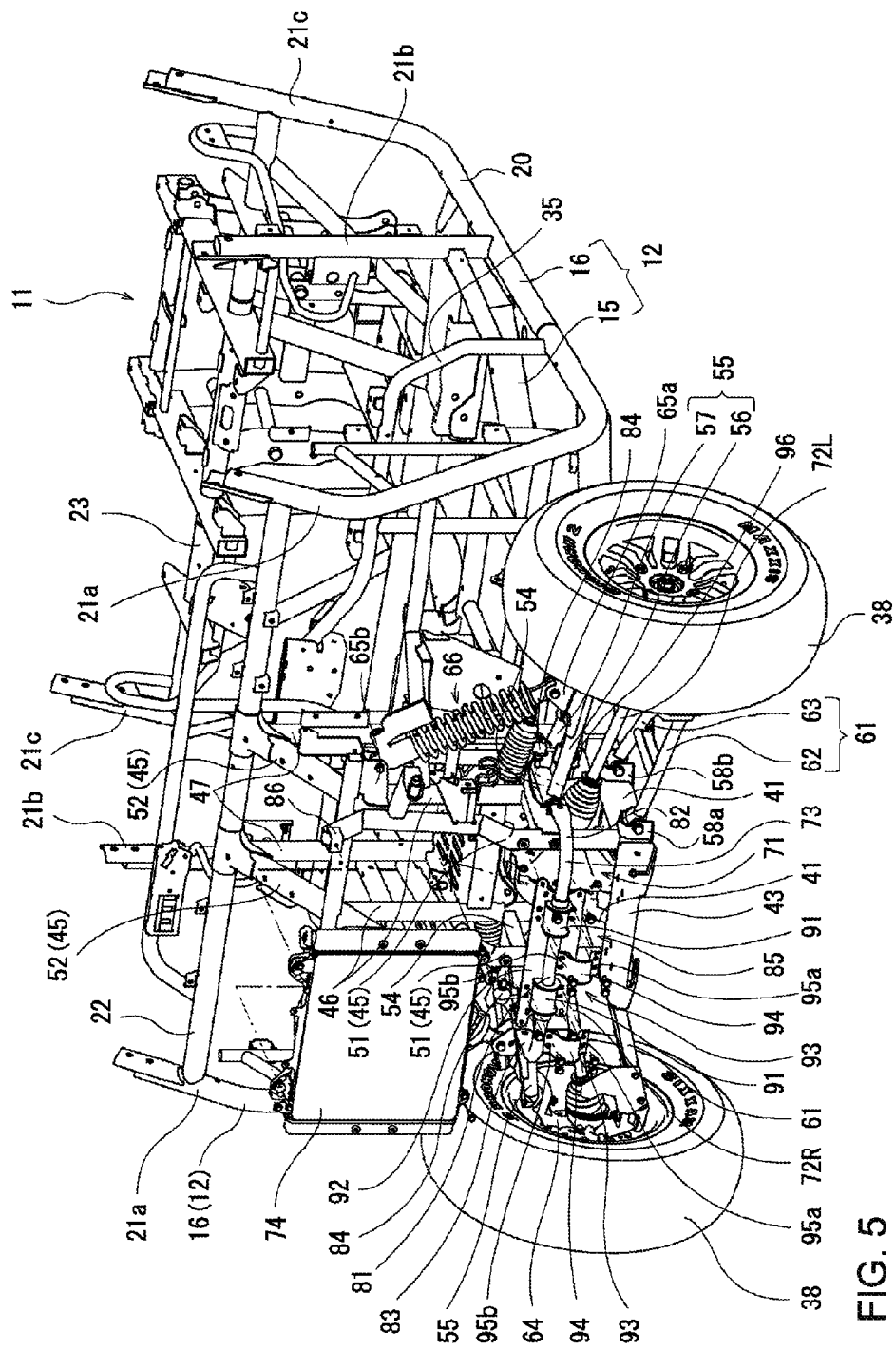
FIG. 5 is a perspective view showing the vehicle body frame, a stabilizer, and a radiator, in an exploded manner.

Each of the front upper sub-frames 46 extends vertically upward from the upper surface of the center portion of the corresponding front lower frame 41 up to the corresponding tilted pipe element 52. A front upper bracket 54 extending in the forward and rearward direction is mounted to the intermediate portion of the front upper sub-frame 46 and the intermediate portion of the corresponding vertically extending pipe element 51. As shown in FIG. 5, a pair of front upper arms 55 are provided at right and left sides of the front end portion of the vehicle body frame such that each front upper arm 55 is mounted to the front upper bracket 54 (see FIG. 4) such that the front upper arm 55 extends outward in the rightward and leftward direction from the front upper bracket 54 and is vertically pivotable. The front upper arm 55 is an A-arm having a substantially A-shape as viewed from above, and includes a pair of front and rear pivot arm elements 56 and 57 which are arranged apart from each other in the forward and rearward direction. The base end portions of the front and rear pivot arm elements 56 and 57 are coupled to the front upper bracket 54 (see FIG. 4) such that the front and rear pivot arm elements 56 and 57 are pivotable. The intermediate portions of the front and rear pivot arm elements 56 and 57 are coupled together and the tip end portions of the front and rear pivot arm elements 56 and 57 are coupled together, thereby forming a substantially A-shape of the A-arm.

A pair of front lower brackets 58a and 58b (see FIG. 4) are mounted to the outer surface of each of the front lower frames 41 such that the front lower brackets 58a and 58b are apart from each other in the forward and rearward direction. As shown in FIG. 5, a pair of front lower arms 61 are provided at right and left sides of the front end portion of the vehicle body frame such that each front lower arm 61 is mounted to the pair of front lower brackets 58a and 58b (see FIG. 4) such that the front lower arm 61 extends outward in the rightward and leftward direction from the front lower brackets 58a and 58b and is vertically pivotable. The front lower arm 61 is an A-arm having a substantially A-shape as viewed from above. The front lower arm 61 includes a pair of front and rear pivot arm elements 62 and 63 which are arranged apart from each other in the forward and rearward direction. The front lower arm 61 has substantially the same shape as the front upper arm 55. The base end portions of the front and rear pivot arm elements 62 and 63 are coupled to the pair of front lower brackets 58a and 58b (see FIG. 4), respectively such that the front and rear pivot arm elements 62 and 63 are pivotable. The intermediate portions of the front and rear pivot arm elements 62 and 63 are coupled together and the tip end portions of the front and rear pivot arm elements 62 and 63 are coupled together, thereby forming a substantially A-shape of the A-arm. The front lower arm 61 having such a structure is positioned to be vertically apart from the front upper arm 55 and to substantially overlap with the front upper arm 55 as viewed from above.

The tip end portion of each of the front upper arms 55 is coupled to the tip end portion of the corresponding front lower arm 61 by means of a front knuckle 64. A drive shaft 72L extending outward to the left from a differential gear device 71 (described later) rotatably penetrates the front knuckle 64, while a drive shaft 72R extending outward to the right from the differential gear device 71 rotatably penetrates the front knuckle 64. The front wheels 38 are mounted to the tip end portions of the drive shafts 72L and 72R, respectively. In this way, the front wheels 38 are suspended from the front portion of the vehicle body frame 11. Suspension brackets 65a and 65b are mounted to the upper surface of the front upper arm 55 and the end portion of the front upper cross member 53, respectively. A front suspension unit 66 is mounted to the suspension brackets 65a and 65b. Thus, the front suspension device 37 at the left side of the front end portion of the vehicle body frame includes the front upper arm 55, the front lower arm 61, the front knuckle 64, the drive shaft 72L, and the front suspension unit 66, while the front suspension device 37 at the right side includes the front upper arm 55, the front lower arm 61, the front knuckle 64, the drive shaft 72R, and the front suspension unit 66.

The center pipes 47 extend vertically at rear ends of the pair of front lower frames 41, respectively. Each center pipe 47 (see FIG. 4) extends upward up to a portion of the front cross member 22 to which the tilted pipe element 52 is coupled. The pair of center pipes 47, together with the pair of front lower frames 41, and the pair of front upper frames 45, define a space 67 in the interior of the front end portion of the vehicle body frame 11. A front differential gear device (hereinafter also referred to as differential gear device) 71 is accommodated into the space 67 at the front end portion of the vehicle body frame 11.

The differential gear device 71 is coupled to the engine E via a front propeller shaft (not shown) and a transmission (not shown). The front drive shaft 72R extends to the right from the differential gear device 71, while the front drive shaft 72L extends to the left from the differential gear device 71. The right and left front drive shafts 72R and 72L are coupled to the right and left front wheels 38, respectively. The differential gear device 71 thus constructed is configured to transmit a driving power generated in the engine E of FIG. 3 to the right and left front wheels 38, thereby allowing the front wheels 38 to rotate. Note that a rear differential gear device (not shown) is provided at the rear side to transmit the driving power generated in the engine E to the right and left rear wheels 36 (see FIG. 1).

The right and left front wheels 38 are coupled to an electric power steering device 28 (see FIG. 2). The electric power steering device 28 allows the utility vehicle 10 to turn its direction according to the operation of the steering handle 27 (see FIG. 2). A part (gear assembly) of the components of the electric power steering device (see FIG. 2) is positioned just behind the front upper arm 55 and the front lower arm 61 at the left side, and the remaining part of the components are accommodated into the space 67. A stabilizer 73 and a radiator 74 are positioned in the front end portion of the vehicle body frame 11 where the differential gear device 71 and the electric power steering device 28 (see FIG. 2) are mounted.

[Stabilizer]

As shown in FIG. 5, the stabilizer 73 is substantially U-shaped as viewed from above. The stabilizer 73 protrudes forward as viewed from above. The stabilizer 73 includes a fastening pipe element 81 and a pair of coupling pipe elements which are a left coupling pipe element 82 and a right coupling pipe element 83. The fastening pipe element 81, which is a center portion of the stabilizer 73, extends in the rightward and leftward direction. The fastening pipe element 81 is positioned in front of the pair of vertically extending pipe elements 51. The length of the fastening pipe element 81 in the rightward and leftward direction is greater than a distance between the pair of vertically extending pipe elements 51. The right and left end portions of the fastening pipe element 81 are located outward relative to the pair of vertically extending pipe elements 51, respectively. The coupling pipe elements 82 and 83 are unitarily coupled to the both end portions of the fastening pipe element 81, respectively. The coupling pipe elements 82 and 83 extend rearward from the right and left end portions of the fastening pipe element 81 such that the coupling pipe elements 82 and 83 are substantially bent at a right angle. The coupling pipe elements 82 and 83 are located outward relative to the pair of vertically extending pipe elements 51, respectively. Because of this structure, the stabilizer 73 is disposed at the front end portion of the vehicle body frame 11 such that the stabilizer 73 extends through a front side of the vehicle body frame 11, outside the vehicle body frame 11, from one end (rear end of the coupling pipe element 82) to an opposite end thereof (rear end of the coupling pipe element 83). In other words, the stabilizer 73 does not extend through the inside of the front end portion of the vehicle body frame 11 where the differential gear device 71, the electric power steering device 28, etc., are arranged. The pair of coupling pipe elements 82 and 83 are mounted to the front upper arms 55 via joint members 84, respectively.

Figure 7:
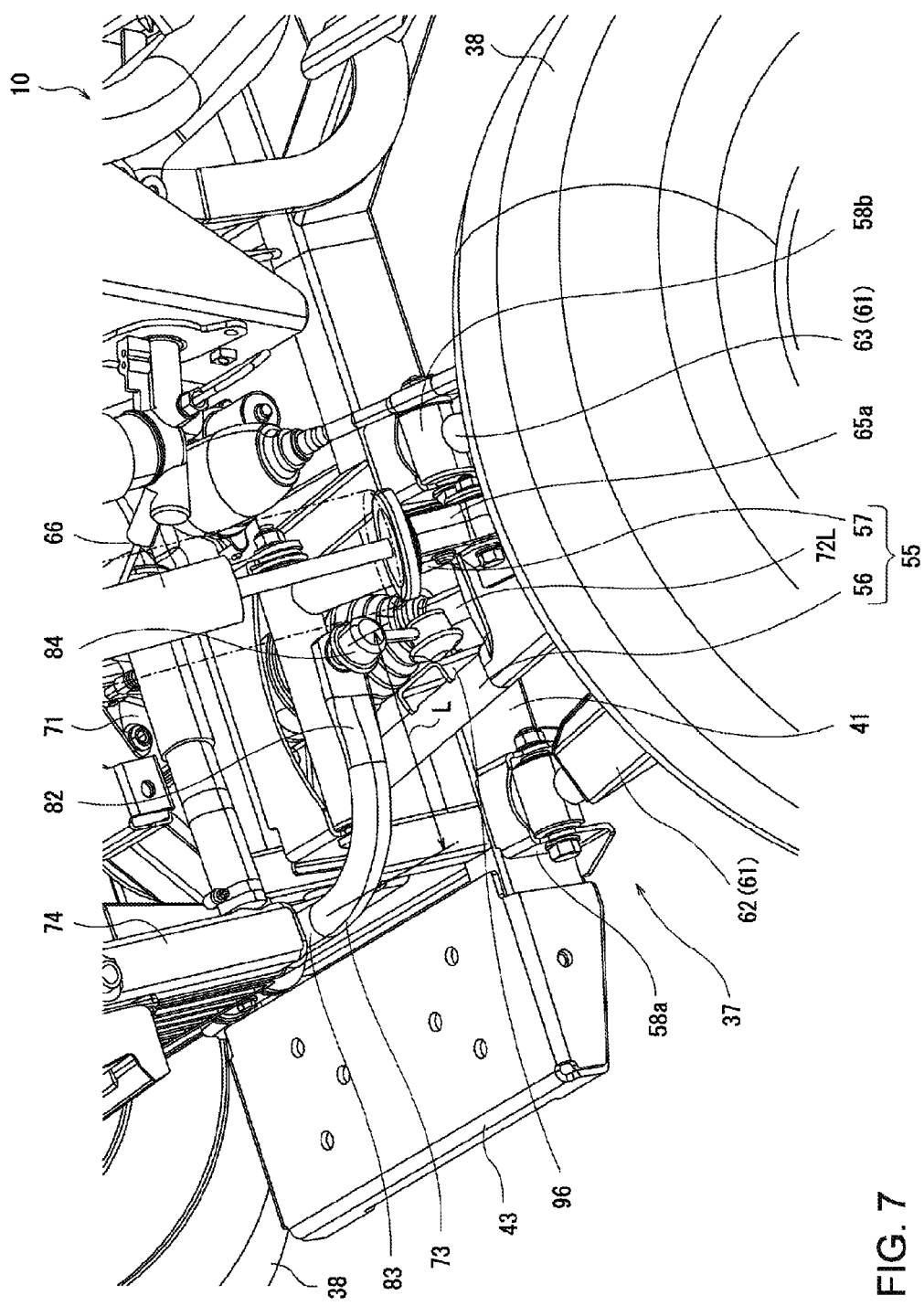
FIG. 7 is a perspective view showing a portion of the stabilizer which is mounted to an A-arm in an enlarged manner.

Referring to FIG. 7, the joint members 84 extend vertically. The upper end portions of the joint members 84 are mounted to the rear end portions of the coupling pipe elements 82 and 83, respectively. Each of the rear end portions of the coupling pipe elements 82 and 83 is located between the pair of pivot arm elements 56 and 57 of the front upper arm 55, as viewed from above, in a location above the front upper arm 55. A mounting bracket 96 is mounted to the rear surface of the front pivot arm element 56. Each of the joint members 84 is mounted to the mounting bracket 96 and the rear end portion of the coupling pipe element 82 or 83. The joint member 84 is mounted to the mounting bracket 96 such that the joint member 84 is pivotable in the rightward and leftward direction. The joint member 84 is mounted to the coupling pipe element 82 or 83 such that the joint member 84 is pivotable in the forward and rearward direction. In the manner as described above, the right and left end portions of the stabilizer 73 are mounted to the front upper arm 55. The fastening pipe element 81 which is the center portion of the stabilizer 73 is mounted to the pair of vertically extending pipe elements 51 via a mounting unit 85.

Figure 6:
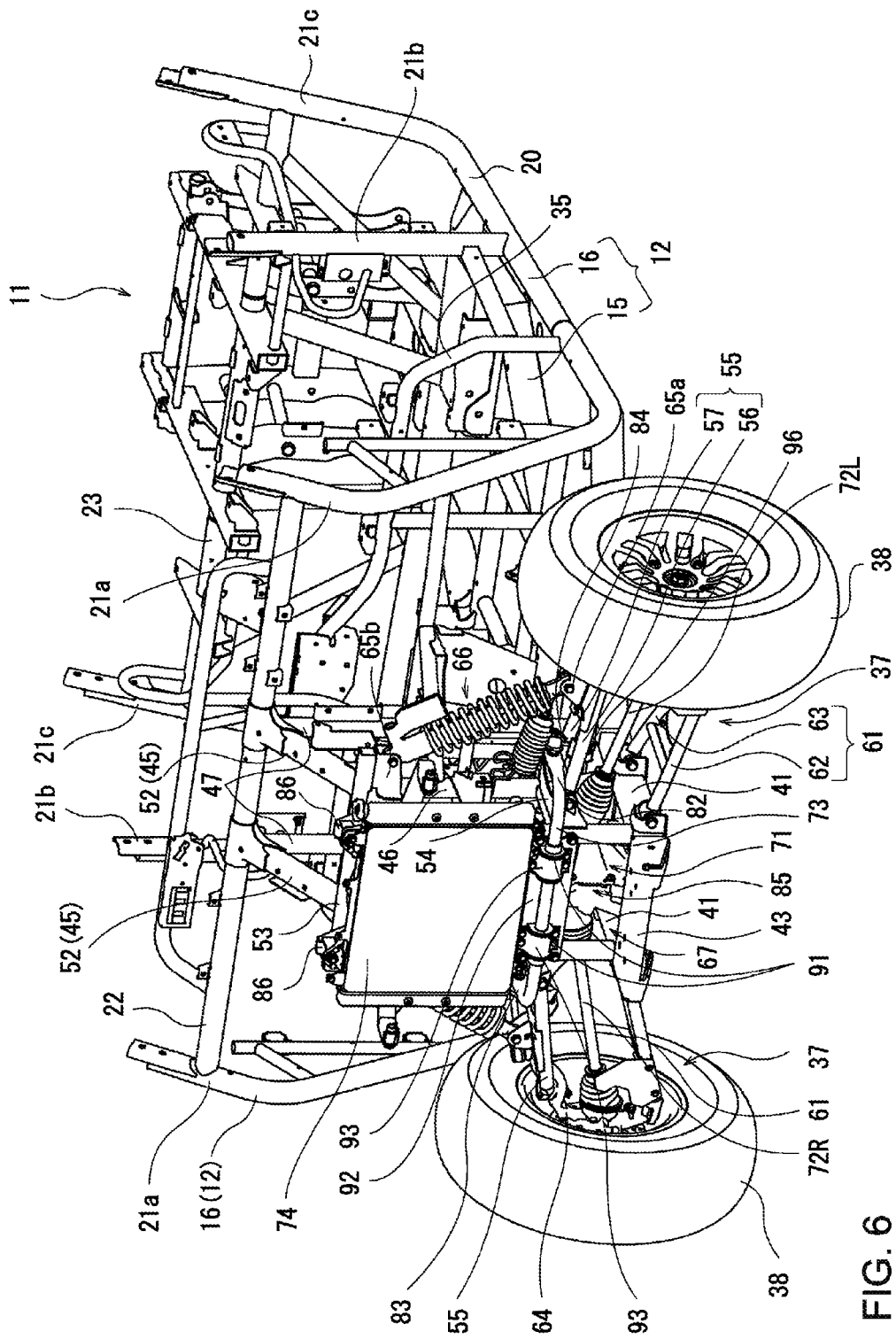
FIG. 6 is a perspective view showing a state where the stabilizer and the radiator are mounted to the vehicle body frame.
Figure 8:
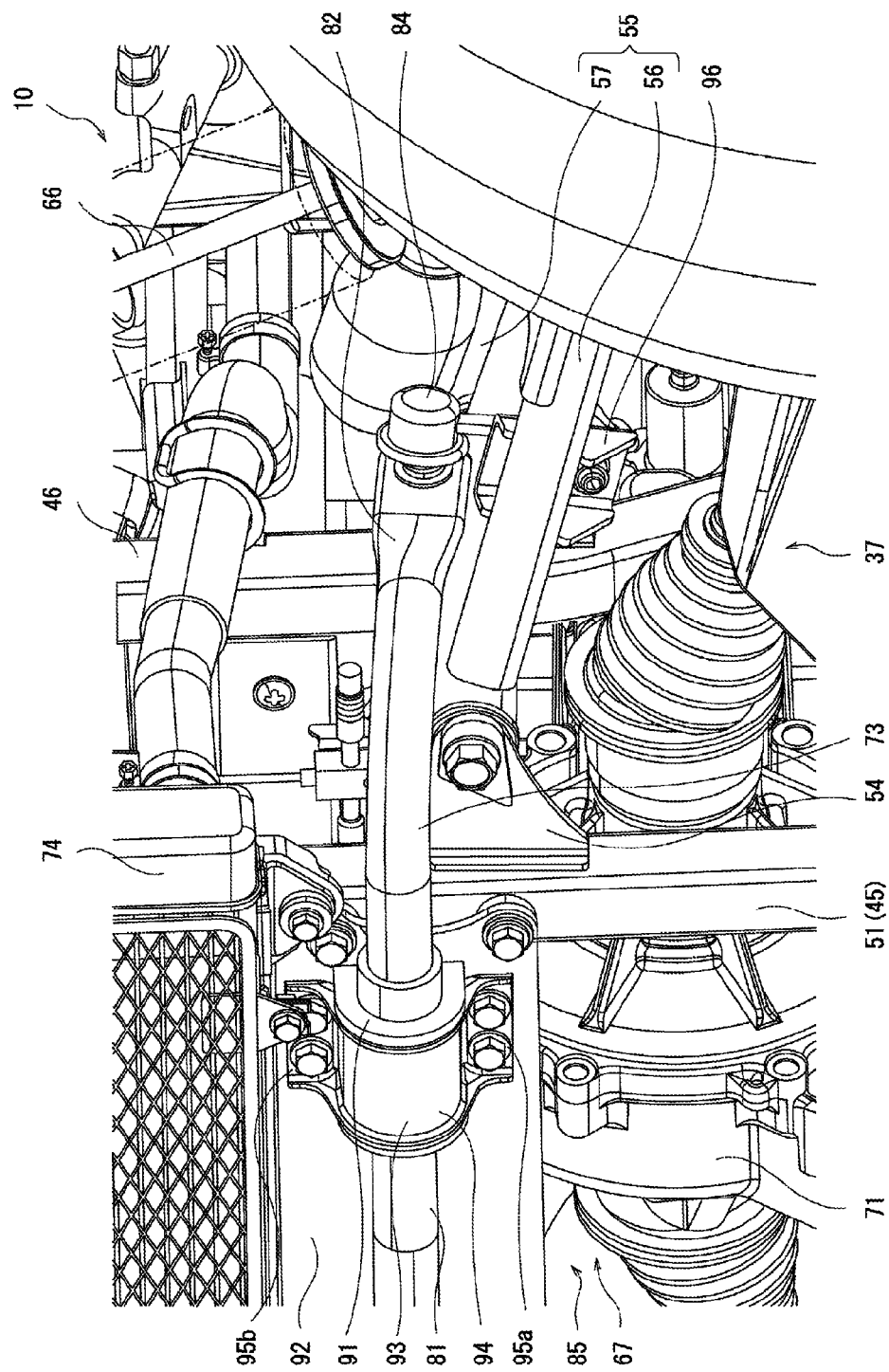
FIG. 8 is a perspective view showing a portion of the stabilizer which is mounted to the vehicle body frame in an enlarged manner.

Referring to FIG. 5, the mounting unit 85 includes a pair of buffer members 91, a support bracket 92, and a pair of support clamps 93. The pair of buffer members 91 are made of a buffer material such as synthetic rubber and have a substantially semi-cylindrical shape. Each of the pair of buffer members 91 has an inner hole extending in an axial direction thereof. The pair of buffer members 91 is arranged at the fastening pipe element 81 to be apart from each other in the rightward and leftward direction, and the fastening pipe element 81 of the stabilizer 73 is inserted into the inner holes of the pair of buffer members 91. Each of the buffer members 91 has a flat surface extending in a direction perpendicular to both its axial end portions. The flat surface of the buffer member 91 is in contact with the front surface of the support bracket 92. The support bracket 92 which is a mounting plate is a plate member of a substantially rectangular shape extending in the rightward and leftward direction. The rear surface of the support bracket 92 is in contact with the lower end portions of the pair of vertically extending pipe elements 51 and is fastened thereto. As shown in FIGS. 6 and 8, a support clamp 93 covers a front semi-cylindrical peripheral surface of each of the buffer members 91.

As shown in FIG. 5, the support clamp 93 is a plate member and includes a covered portion 94 and fastening portions 95a and 95b. The covered portion 94 is substantially C-shaped, and its inner surface conforms in shape to the semi-cylindrical peripheral surface of the buffer member 91. The fastening portions 95a and 95b are unitarily connected to the circumferential end portions of the covered portion 94. The fastening portions 95a and 95b extend outward, to be precise, upward and downward from the circumferential end portions of the covered portion 94, respectively. The fastening portions 95a and 95b are in contact with the front surface of the support bracket 92, and are fastened thereto. By fastening the fastening portions 95a and 95b to the support bracket 92, the fastening pipe element 81 of the stabilizer 73 is mounted to the pair of vertically extending pipe elements 51 via the mounting unit 85.

As should be appreciated from the above, the stabilizer 73 is mounted to the pair of right and left front upper arms 55 such that the stabilizer 73 extends through a front side of the vehicle body frame 11, outside the vehicle body frame 11, from one end (rear end of the coupling pipe element 82) to an opposite end thereof (rear end of the coupling pipe element 83). Because of this layout, the stabilizer 73 can be mounted to the vehicle body frame 11 from forward such that the stabilizer 73 does not pass through a space between devices such as the differential gear device 71 and the electric power steering device 28 which are accommodated into the space 67 formed within the front end portion of the vehicle body frame 11. This allows the stabilizer 73 to have a simple shape such as substantially-U-shape and to be mounted easily to the vehicle body frame 11. Because of the substantially-U-shape, the fastening pipe element 81 has a straight-line shape. This makes it possible to design the stabilizer 73 easily and hence manufacture the stabilizer 73 easily using a die.

The fastening pipe element 81 is fastened to the front end of the vehicle body frame 11. The rear end portion of each of the coupling pipe elements 82 and 83 is positioned between the pair of pivot arm elements 56 and 57 of the front upper arm 55. This allows the length of the coupling pipe elements 82 and 83, i.e., arm length L of the stabilizer 73 of FIG. 7, to be greater, and makes it possible to ensure a spring contact required for the stabilizer 73. Thus, it is not necessary to increase the arm length L for ensuring the spring constant required for the stabilizer 73 and to position the fastening pipe element 81 in a location which is a substantial distance away from the front upper arm 55 and the front end of the vehicle body frame 11, in front of the front upper arm 55 and the front end of the vehicle body frame 11. This makes it possible to prevent an angle with which the utility vehicle 10 is accessible, from decreasing.

[Radiator]

Referring to FIG. 8, the radiator 74 is mounted to the support bracket 92 of the mounting unit 85. The common support bracket 92 is used to mount the radiator 74 and the stabilizer 73 to the vehicle body frame 11. The radiator 74 serves to cool a coolant used to cool the engine E, and has a substantially plate shape. The radiator 74 is oriented to extend vertically. The radiator 74 is positioned above the stabilizer 73 such that the lower end portion of the radiator 74 is caused to overlap with the upper end portion of the support bracket 92 from a forward direction. The right and left portions of the lower end portion of the radiator 74 are fastened to the support bracket 92. The radiator 74 is mounted to the pair of vertically extending pipe elements 51 via the support bracket 92. As shown in FIG. 6, mounting brackets 86 are mounted to the upper end portions of the pair of vertically extending pipe elements 51, respectively. The right and left portions of the upper end portion of the radiator 74 are fastened to the mounting brackets 86, respectively.

Since the radiator 74 mounted to the vehicle body frame 11 as described above is positioned above the stabilizer 73, it is possible to prevent the radiator 74 from getting immersed in water during, for example, driving in a puddle. In addition, since the common support bracket 92 is used to mount both of the radiator 74 and the stabilizer 73 to the vehicle body frame 11, the number of components can be reduced.

[Other Embodiment]

Although in the utility vehicle 10 of the embodiment, the mounting bracket 96 by which the stabilizer 73 is mounted to the front upper arm 55 is positioned on the rear surface of the front pivot arm 56 of the front upper arm 55, it may be mounted to the front surface of the front pivot arm element 56 or to the front surface or rear surface of the rear pivot arm element 57, or it is not always necessary to position the rear end portion of each of the coupling pipe elements 82 and 83 between the pair of pivot arm elements 56 and 57.

Although the common support bracket 92 is used to mount the radiator 74 and the stabilizer 73 to the vehicle body frame 11, the support brackets 92 may be provided independently to respectively correspond to the radiator 74 and the stabilizer 73, or both portions of the lower end portion of the radiator 74 may be directly fastened to the pair of vertically extending pipe elements 51.

Although in the utility vehicle 10 of the present embodiment, the differential gear device 71 is mounted into the interior of the front end portion of the vehicle body frame 11 to drive the front wheels 38, it is not necessary to drive the front wheels 38. That is, the stabilizer 73 may be applied to a utility vehicle which does not incorporate the differential gear device 71. Likewise, the utility vehicle 10 may not incorporate the rear differential gear device. Furthermore, although in the utility vehicle 10, the front wheels 38 and the rear wheels 36 are driven by the engine E, a motor may be used instead of the engine E and drive the front wheels 38 and the rear wheels 36.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A utility vehicle comprising:
a vehicle body frame;
a first pair of pivot arms provided at right and left sides, respectively, at a front end portion of the vehicle body frame such that the first pair of pivot arms extend in a rightward and leftward direction from the front end portion of the vehicle body frame and are vertically pivotable, the first pair of pivot arms being attached to front wheels at tip ends thereof, respectively;
a stabilizer having one end mounted to one of the first pair of pivot arms and an opposite end mounted to the other of the first pair of pivot arms, the stabilizer extending through a front side of the vehicle body frame, outside the vehicle body frame, from the one end thereof to the opposite end thereof, the stabilizer having an intermediate portion located in front of the vehicle body frame and mounted to the front end portion of the vehicle body frame;
a radiator for cooling a coolant used to cool an engine of the utility vehicle; and
a mounting plate mounted to the front end portion of the vehicle body frame;
wherein, the intermediate portion of the stabilizer and the radiator are mounted to a front surface of the mounting plate, and mounted to the front end portion of the vehicle body frame via the mounting plate.

2. The utility vehicle according to claim 1, wherein the stabilizer has a substantially U-shape.

3. The utility vehicle according to claim 1, wherein:
each of the first pair of pivot arms has a pair of front and rear pivot arm elements which are arranged apart from each other in a forward and rearward direction of the utility vehicle, and are mounted to the front end portion of the vehicle body frame and a corresponding one of the front wheels; and
each of the one end of the stabilizer and the opposite end of the stabilizer is positioned between the pair of front and rear pivot arm elements.

4. The utility vehicle according to claim 1, further comprising:
a second pair of pivot arms provided at right and left sides and mounted to the vehicle body frame such that the second pair of pivot arms are vertically spaced apart from the first pair of pivot arms, respectively.

5. The utility vehicle according to claim 1, wherein the stabilizer is positioned below the radiator.

6. The utility vehicle according to claim 1, wherein the stabilizer is mounted to the mounting plate via a buffer member.

7. The utility vehicle according to claim 1, wherein the vehicle body frame has a pair of pipes at the front end portion thereof; and
wherein the mounting plate is mounted to the pair of pipes such that the mounting plate is disposed between the pair of pipes.

* * * * *